United States Patent
Kang et al.

(10) Patent No.: US 7,205,072 B2
(45) Date of Patent: *Apr. 17, 2007

(54) LAYERED CATHODE MATERIALS FOR LITHIUM ION RECHARGEABLE BATTERIES

(75) Inventors: Sun-Ho Kang, Naperville, IL (US); Khalil Amine, Downers Grove, IL (US)

(73) Assignee: The University of Chicago, Chicago, IL (US)

( * ) Notice: Subject to any disclaimer, the term of this patent is extended or adjusted under 35 U.S.C. 154(b) by 517 days.

This patent is subject to a terminal disclaimer.

(21) Appl. No.: 10/699,484

(22) Filed: Oct. 31, 2003

(65) Prior Publication Data

US 2004/0091779 A1     May 13, 2004

Related U.S. Application Data

(60) Provisional application No. 60/423,347, filed on Nov. 1, 2002.

(51) Int. Cl.
*H01M 4/48* (2006.01)
*H01M 4/50* (2006.01)
*H01M 4/52* (2006.01)

(52) U.S. Cl. .............................. 429/231.95; 429/231.1; 429/231.3

(58) Field of Classification Search ............. 429/231.1, 429/223, 231.3, 231.95; 423/420.2, 594.4, 423/594.6
See application file for complete search history.

(56) References Cited

U.S. PATENT DOCUMENTS 6,040,090 A * 3/2000 Sunagawa et al. ..... 429/231.95
6,677,082 B2    1/2004 Thackeray et al.
6,680,143 B2    1/2004 Thackeray et al.
2002/0055042 A1 * 5/2002 Kweon et al. .............. 429/223
2002/0119374 A1 * 8/2002 Yang et al. ............... 429/231.1

FOREIGN PATENT DOCUMENTS

JP     2000243394 A * 9/2000

OTHER PUBLICATIONS

Ohzuku et al., "Layered Lithium Insertion Material of LiNi½Mn½O₂: A Possible Alternative to LiCoO₂ for Advanced Lithium-Ion Batteries", Chemistry Letters, 2001, pp. 744-745, The Chemical Society of Japan.

Lu et al., "Layered Cathode Materials Li[Ni$_x$Li(⅓−2$x$/3)Mn(⅔−$x$/3)]O₂ for Lithium-Ion Batteries," Electrochemical and Solid-State Letters, 2001, pp. A191-A194, vol. 4 (11), The Electrochemical Society, Inc.

Lu et al., "Understanding the Anomalous Capacity of Li/Li[Ni$_x$Li(⅓−2$x$/3)Mn(⅔−$x$/3)]O₂ Cells Using In Situ X-Ray Diffraction and Electrochemical Studies", Journal of The Electrochemical Society, 2002, pp. A815-A822, vol. 149 (7), The Electrochemical Society, Inc.

Kim et al., "Layered xLiMO₂•(1−x)Li₂M'O₃ Electrodes for Lithium Batteries; A study of 0.95LiMn₀.₅O₂•0.05Li₂TiO₃", Elsevier Science B.V., 2002, pp. 205-209, vol. 4, Electrochemistry Communications.

* cited by examiner

*Primary Examiner*—Gregg Cantelmo
(74) *Attorney, Agent, or Firm*—Foley & Lardner LLP

(57) ABSTRACT

A number of materials with the composition $Li_{1+x}Ni_\alpha Mn_\beta Co_\gamma M'_\delta O_{2-z}F_z$ (M'=Mg,Zn,Al,Ga,B,Zr,Ti) for use with rechargeable batteries, wherein x is between about 0 and 0.3, α is between about 0.2 and 0.6, β is between about 0.2 and 0.6, γ is between about 0 and 0.3, δ is between about 0 and 0.15, and z is between about 0 and 0.2. Adding the above metal and fluorine dopants affects capacity, impedance, and stability of the layered oxide structure during electrochemical cycling.

20 Claims, 19 Drawing Sheets

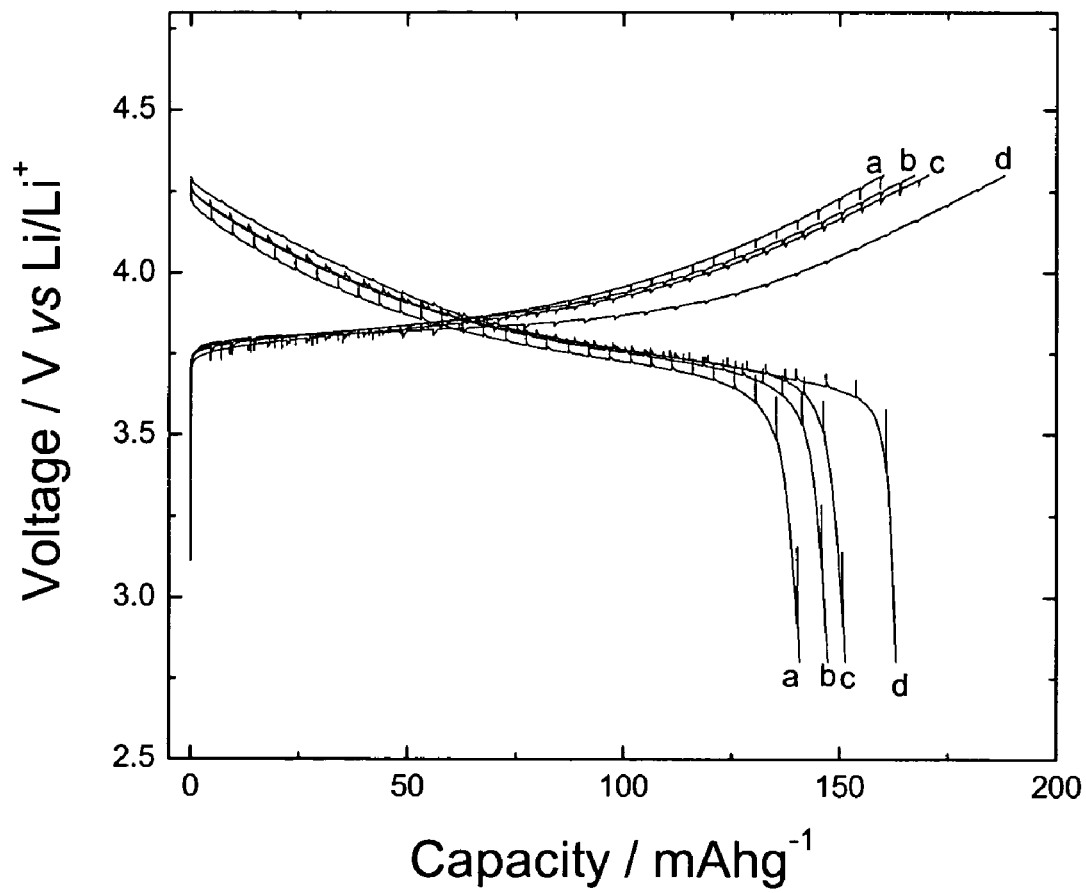
Figure 5. The first charge/discharge curves of $Li(Ni_\alpha Mn_\beta Co_\gamma)O_{2-z}F_z$.
(a) $\alpha=0.5$, $\beta=0.5$, $\gamma=0$, $z=0$; (b) $\alpha=0.505$, $\beta=0.495$, $\gamma=0$, $z=0.01$;
(c) $\alpha=0.51$, $\beta=0.49$, $\gamma=0$, $z=0.02$; (d) $\alpha=0.41$, $\beta=0.39$, $\gamma=0.2$, $z=0.02$

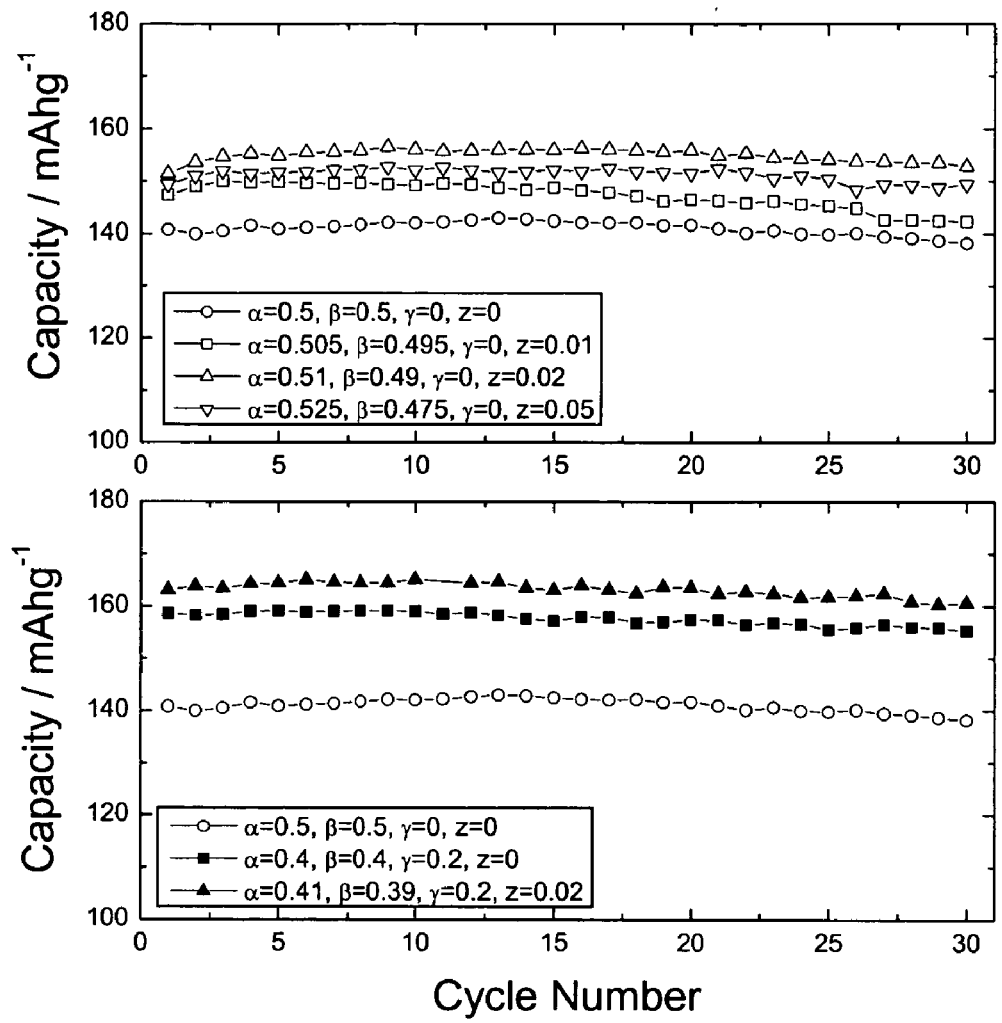
Figure 6. Vairation of discharge capacity with cycling number of $Li(Ni_\alpha Mn_\beta Co_\gamma)O_{2-z}F_z$.

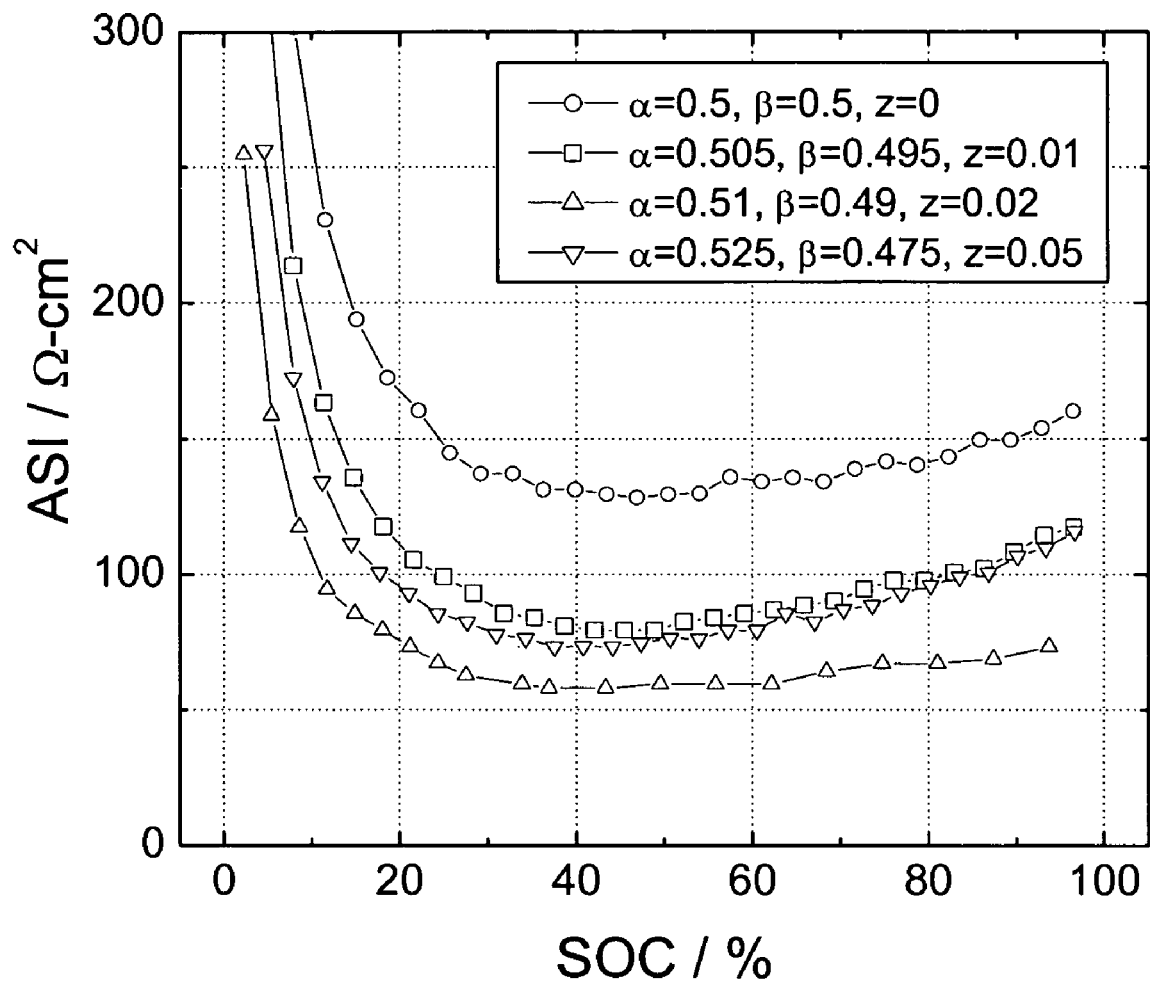
Figure 7. Area specific impedance (ASI) as a function of state of charge (SOC) of $Li(Ni_\alpha Mn_\beta)O_{2-z}F_z$.

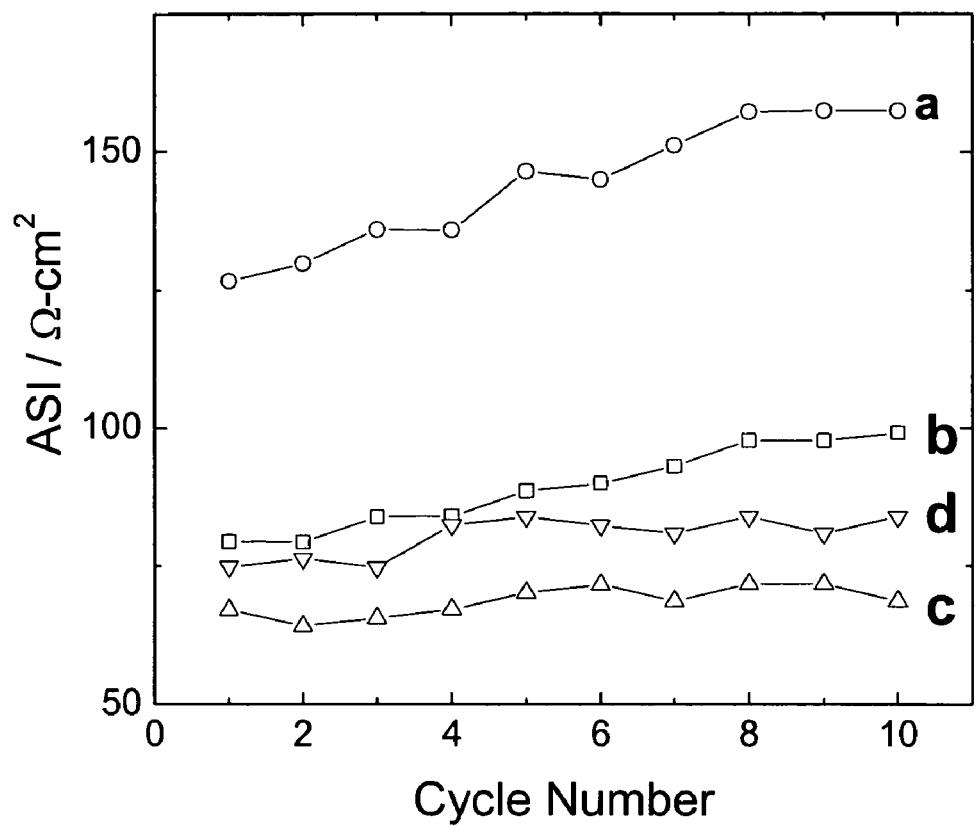
Figure 8. Variation of ASI at 50% SOC of $Li(Ni_\alpha Mn_\beta)O_{2-z}F_z$.
(a) $\alpha=0.5$, $\beta=0.5$, $z=0$; (b) $\alpha=0.505$, $\beta=0.495$, $z=0.01$
(c) $\alpha=0.51$, $\beta=0.49$, $z=0.02$; (d) $\alpha=0.525$, $\beta=0.475$, $z=0.05$

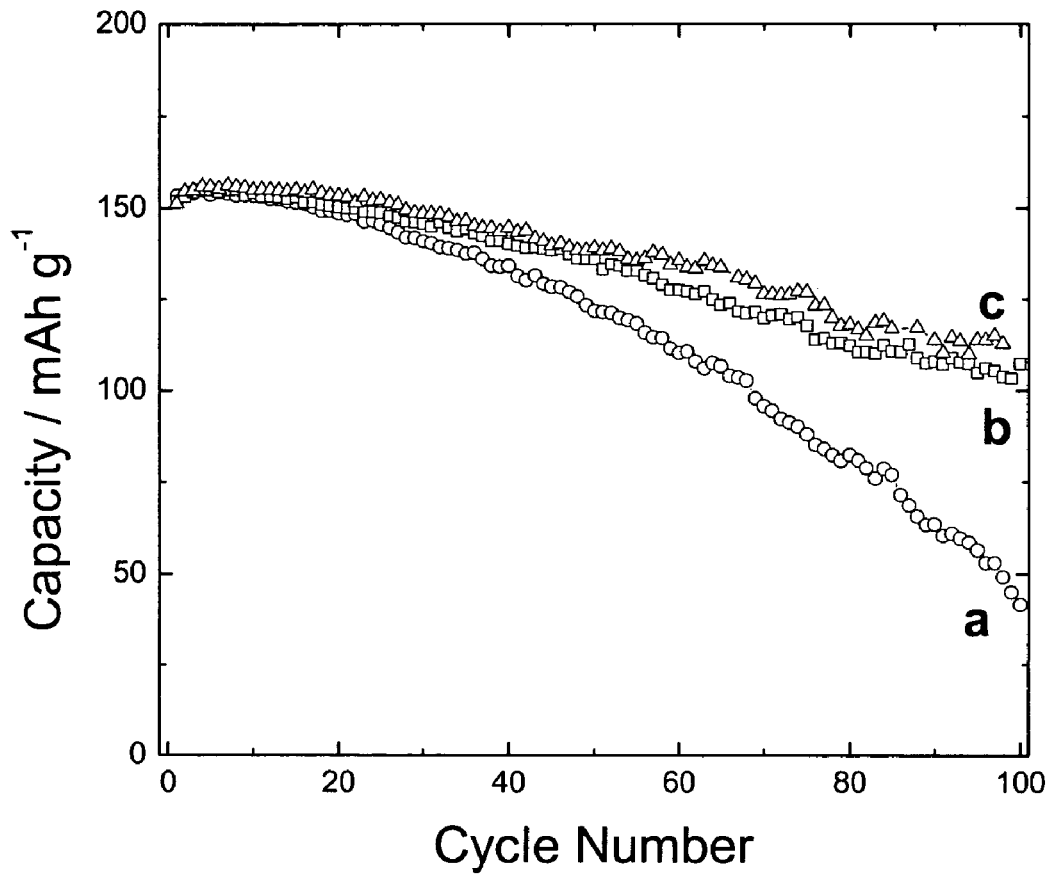
Figure 9. Variation of discharge capacity with cycling of Li/ Li(Ni$_\alpha$Mn$_\beta$Co$_\gamma$)O$_2$ cells at room temperature.
(a) $\alpha$=0.4, $\beta$=0.4, $\gamma$=0.2, uncoated;
(b) $\alpha$=0.4, $\beta$=0.4, $\gamma$=0.2, coated with 0.5wt% Al-isopropoxide;
(c) $\alpha$=0.4, $\beta$=0.4, $\gamma$=0.2, coated with 1.0wt% Al-isopropoxide.

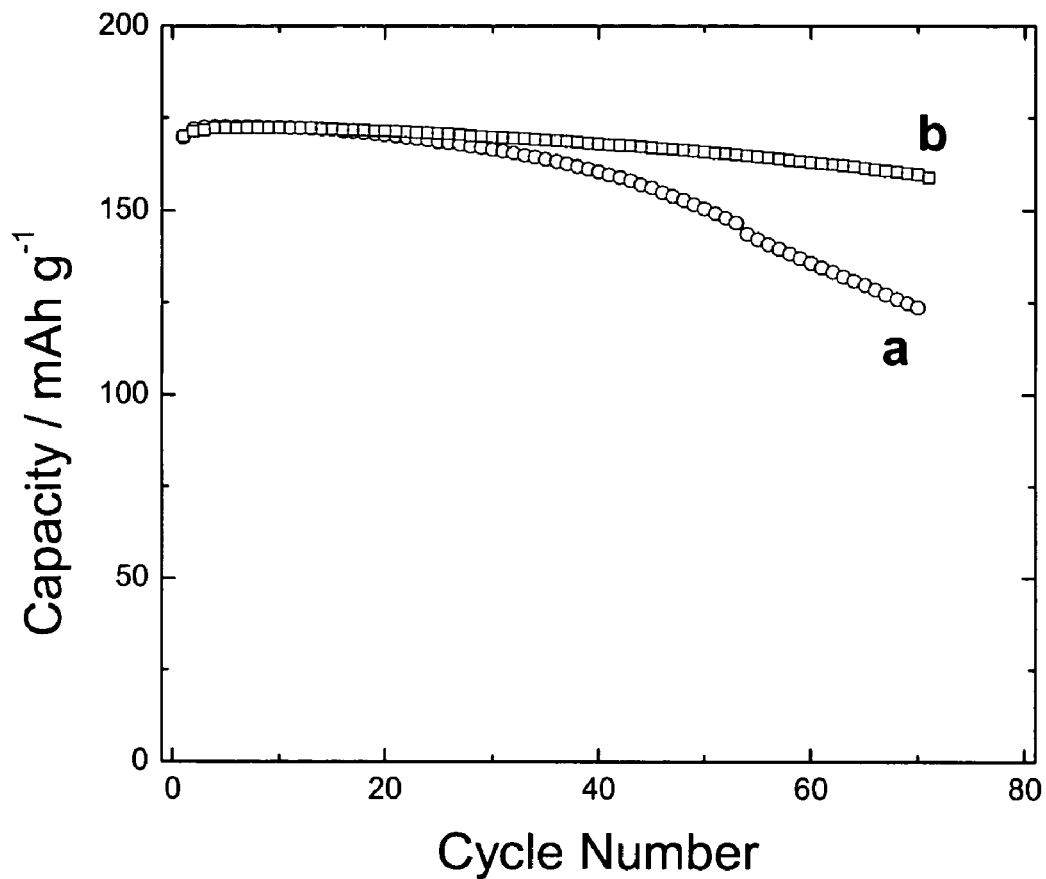
Figure 10. Variation of discharge capacity with cycling of Li/ Li(Ni$_\alpha$Mn$_\beta$Co$_\gamma$)O$_2$ cells at 55°C.
(a) $\alpha$=0.4, $\beta$=0.4, $\gamma$=0.2, uncoated;
(b) $\alpha$=0.4, $\beta$=0.4, $\gamma$=0.2, coated with 0.5wt% Al-isopropoxide.

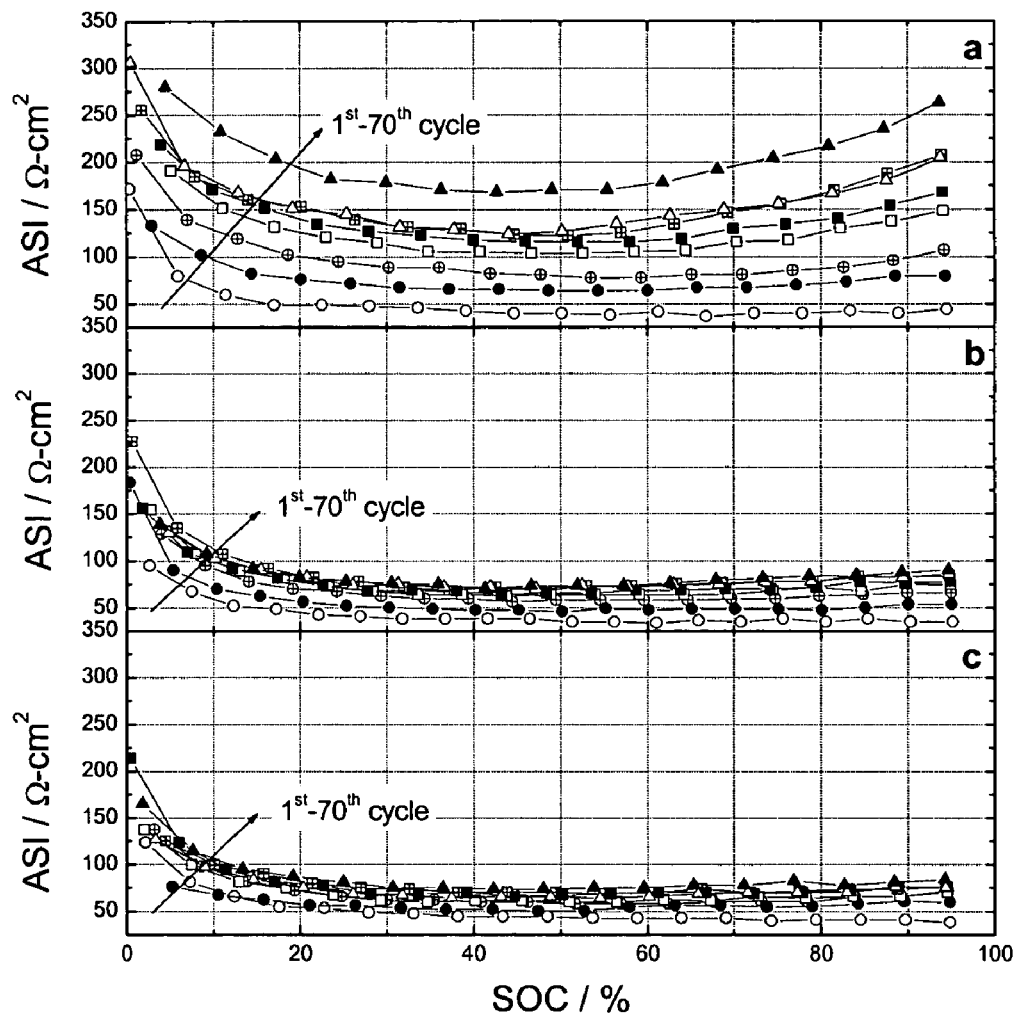
Figure 11. Variation of area specific impedance (ASI) with cycling measured with C/ Li(Ni$_\alpha$Mn$_\beta$Co$_\gamma$)O$_2$ cells.
(a) $\alpha$=0.4, $\beta$=0.4, $\gamma$=0.2, uncoated;
(b) $\alpha$=0.4, $\beta$=0.4, $\gamma$=0.2, coated with 0.5wt% Al-isopropoxide;
(c) $\alpha$=0.4, $\beta$=0.4, $\gamma$=0.2, coated with 1.0wt% Al-isopropoxide.

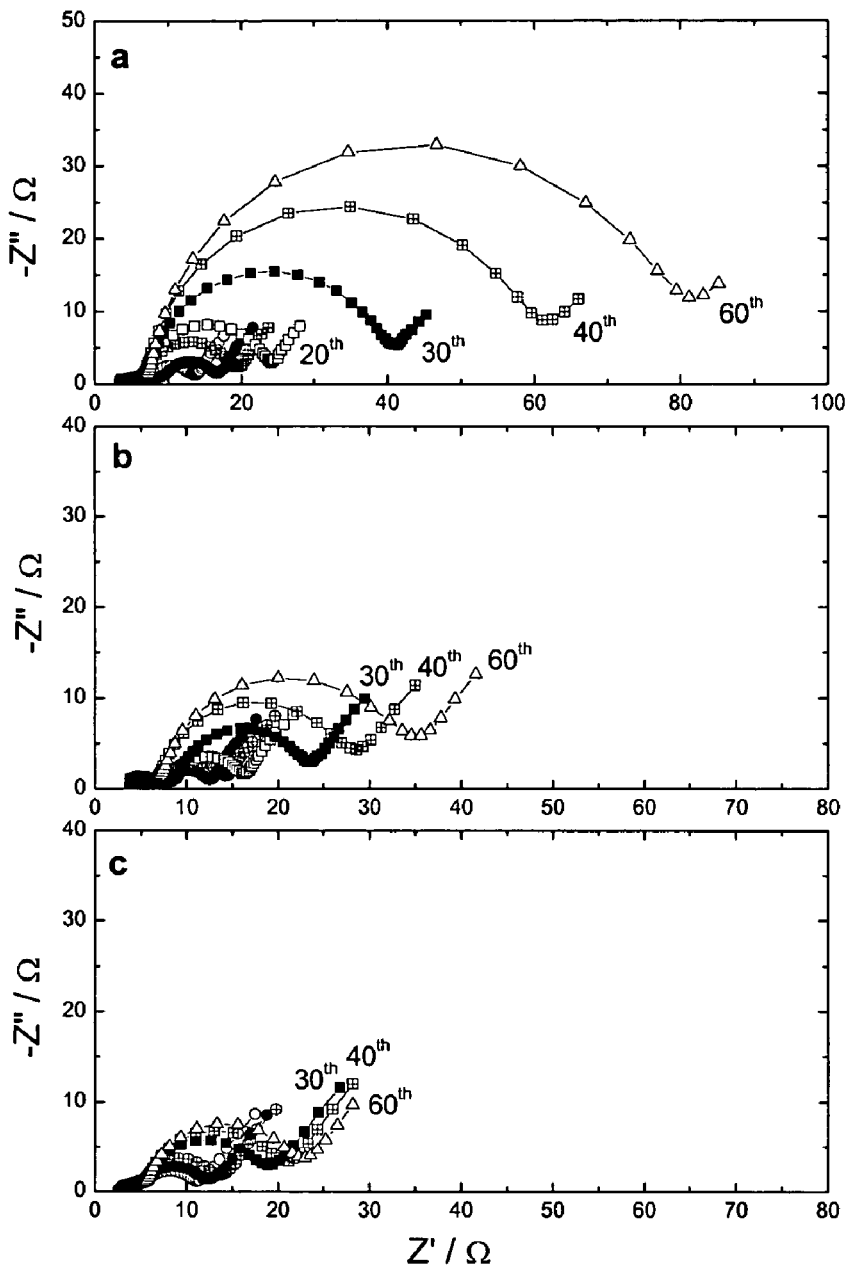
Figure 12. Variation of a.c. impedance
with cycling measured with C/ Li(Ni$_\alpha$Mn$_\beta$Co$_\gamma$)O$_2$ cells.
(a) $\alpha=0.4$, $\beta=0.4$, $\gamma=0.2$, uncoated;
(b) $\alpha=0.4$, $\beta=0.4$, $\gamma=0.2$, coated with 0.5wt% Al-isopropoxide;
(c) $\alpha=0.4$, $\beta=0.4$, $\gamma=0.2$, coated with 1.0wt% Al-isopropoxide.

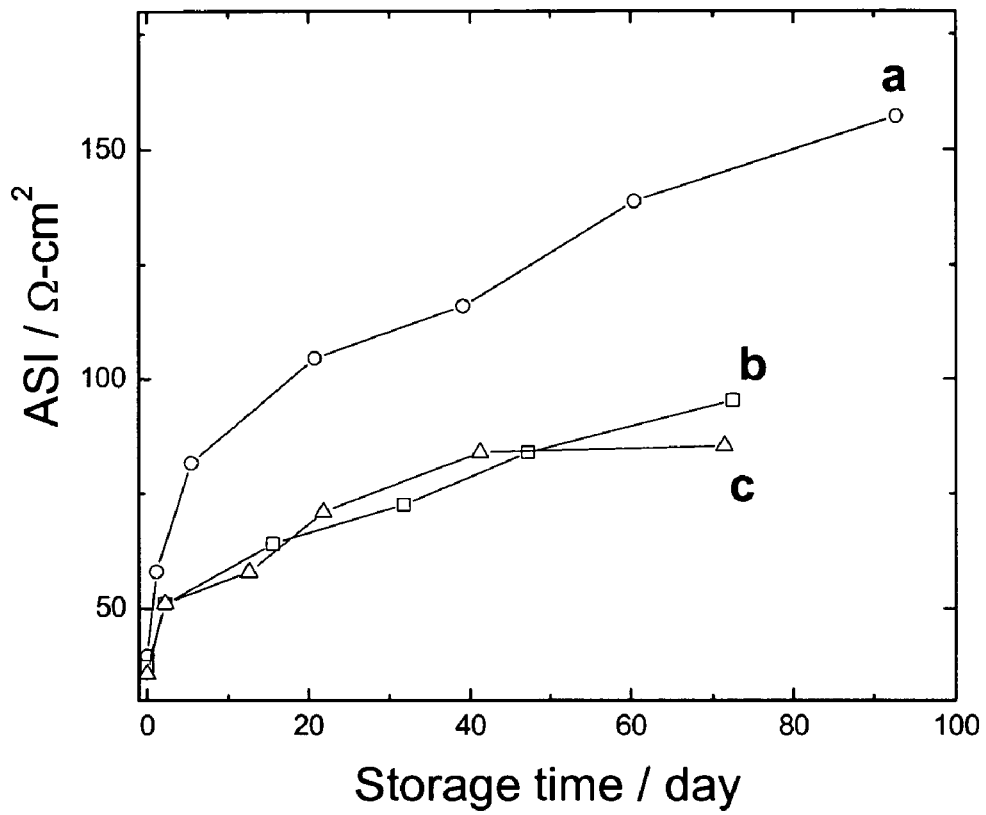
Figure 13. Variation of area specific impedance at 60% SOC with 55°C-storage time measured with C/ Li($Ni_\alpha Mn_\beta Co_\gamma$)$O_2$ cells.
(a) α=0.4, β=0.4, γ=0.2, uncoated;
(b) α=0.4, β=0.4, γ=0.2, coated with 0.5wt% Al-isopropoxide;
(c) α=0.4, β=0.4, γ=0.2, coated with 1.0wt% Al-isopropoxide.

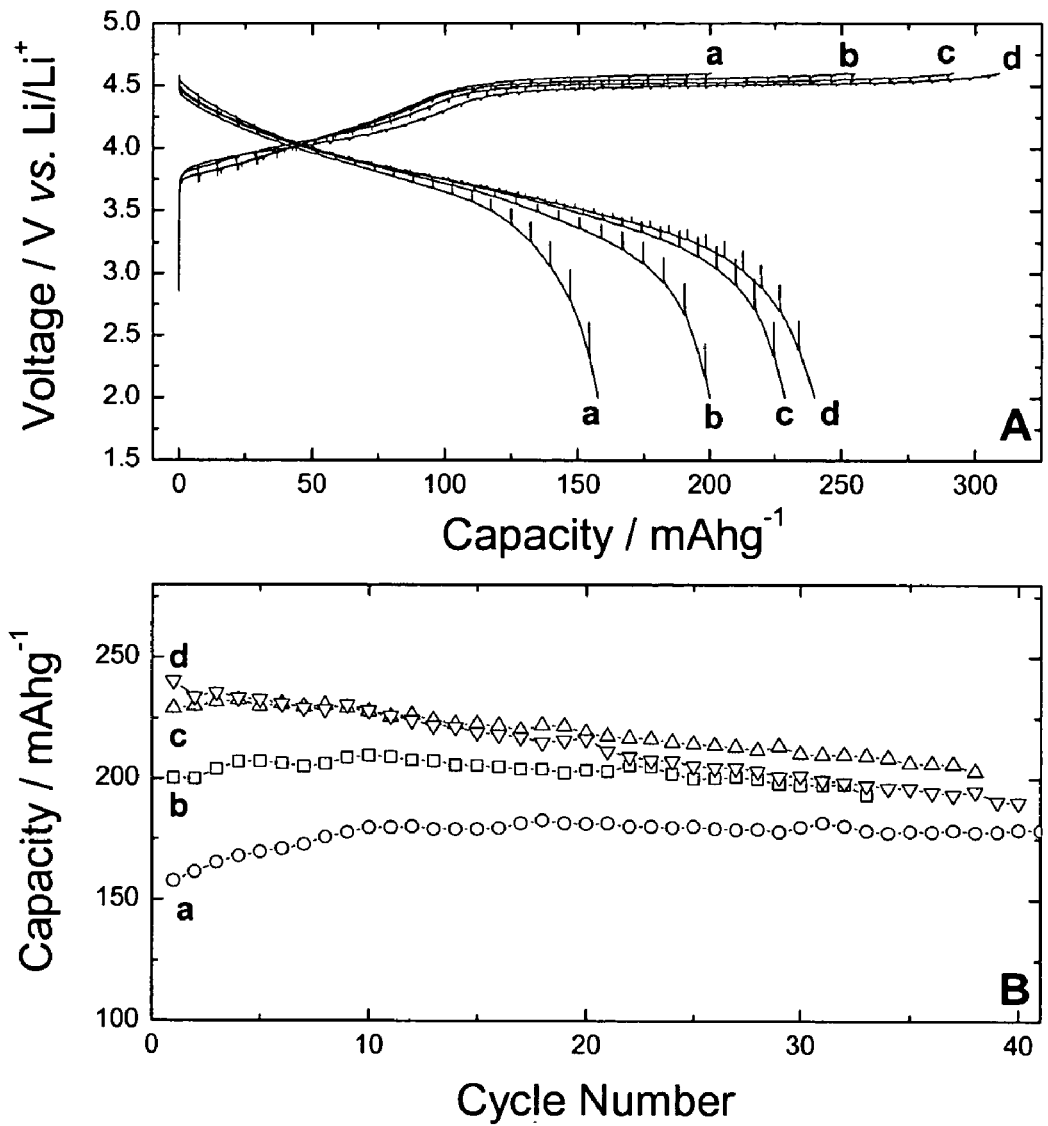
Figure 14. The first charge/discharge curves (A) and cycling performance (B) of Li/Li$_{1+x}$(Ni$_\alpha$Mn$_\beta$Co$_\gamma$)O$_2$ cells.
(a) x=0.2, α=0.2, β=0.6, γ=0;
(b) x=0.2, α=0.195, β=0.595, γ=0.01;
(c) x=0.2, α=0.175, β=0.575, γ=0.05;
(d) x=0.2, α=0.15, β=0.55, γ=0.10.

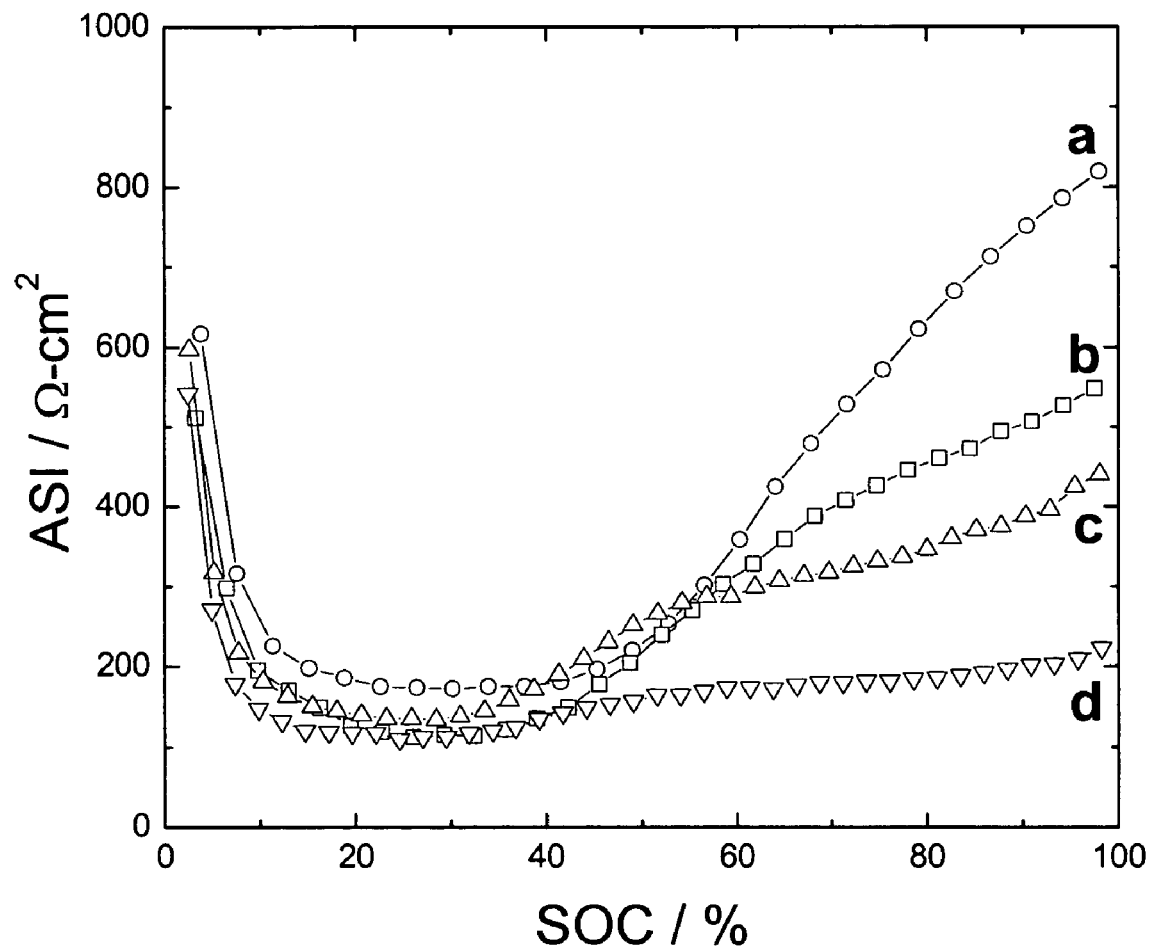
Figure 15. The area specific impedance as a function of state of charge of $C/Li_{1+x}(Ni_\alpha Mn_\beta Co_\gamma)O_2$ cells.
(a) x=0.2, α=0.2, β=0.6, γ=0;
(b) x=0.2, α=0.195, β=0.595, γ=0.01;
(c) x=0.2, α=0.175, β=0.575, γ=0.05;
(d) x=0.2, α=0.15, β=0.55, γ=0.10.

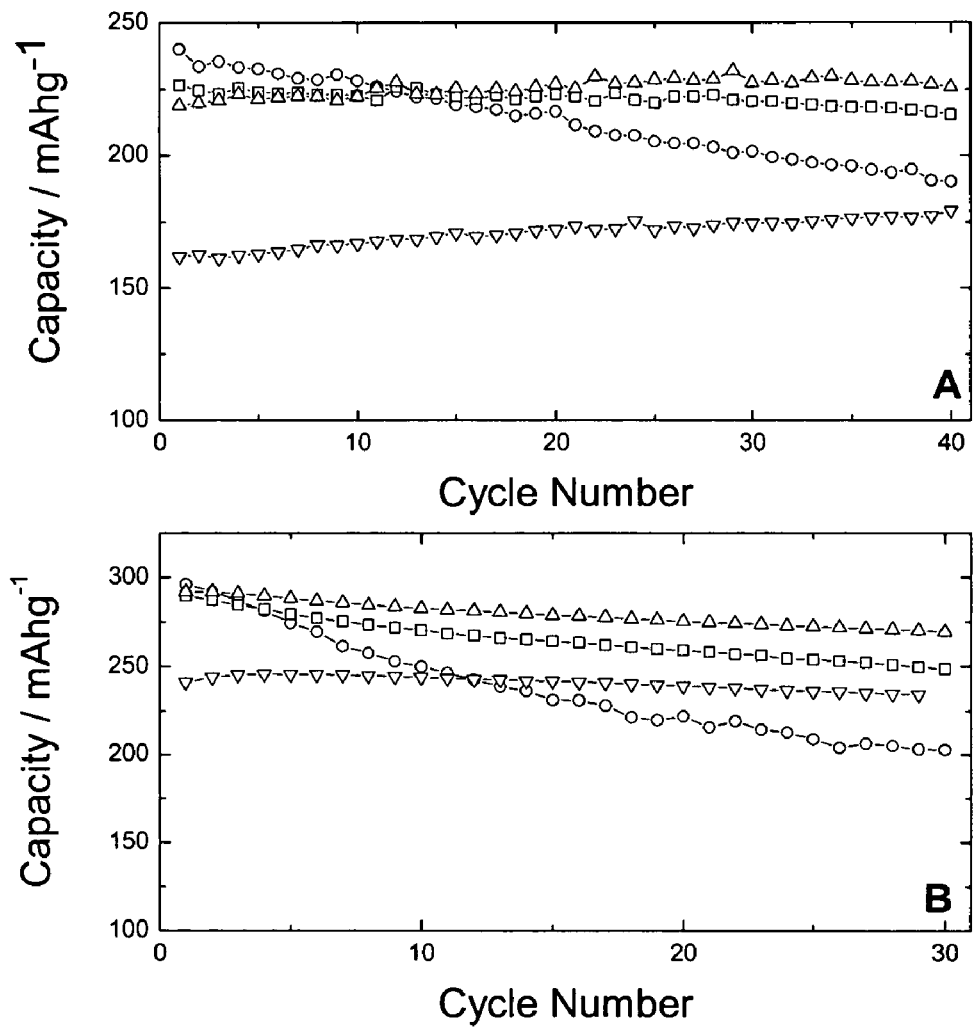
Figure 16. Cycling performance of Li/Li$_{1+x}$(Ni$_\alpha$Mn$_\beta$Co$_\gamma$)O$_{2-z}$F$_z$ cells at room tempearture (A) and at 55°C (B).
(a) —○— x=0.2, α=0.15, β=0.55, γ=0.1, z=0;
(b) —□— x=0.2, α=0.16, β=0.54, γ=0.1, z=0.02;
(c) —△— x=0.2, α=0.175, β=0.525, γ=0.1, z=0.05;
(d) —▽— x=0.2, α=0.2, β=0.5, γ=0.1, z=0.1.

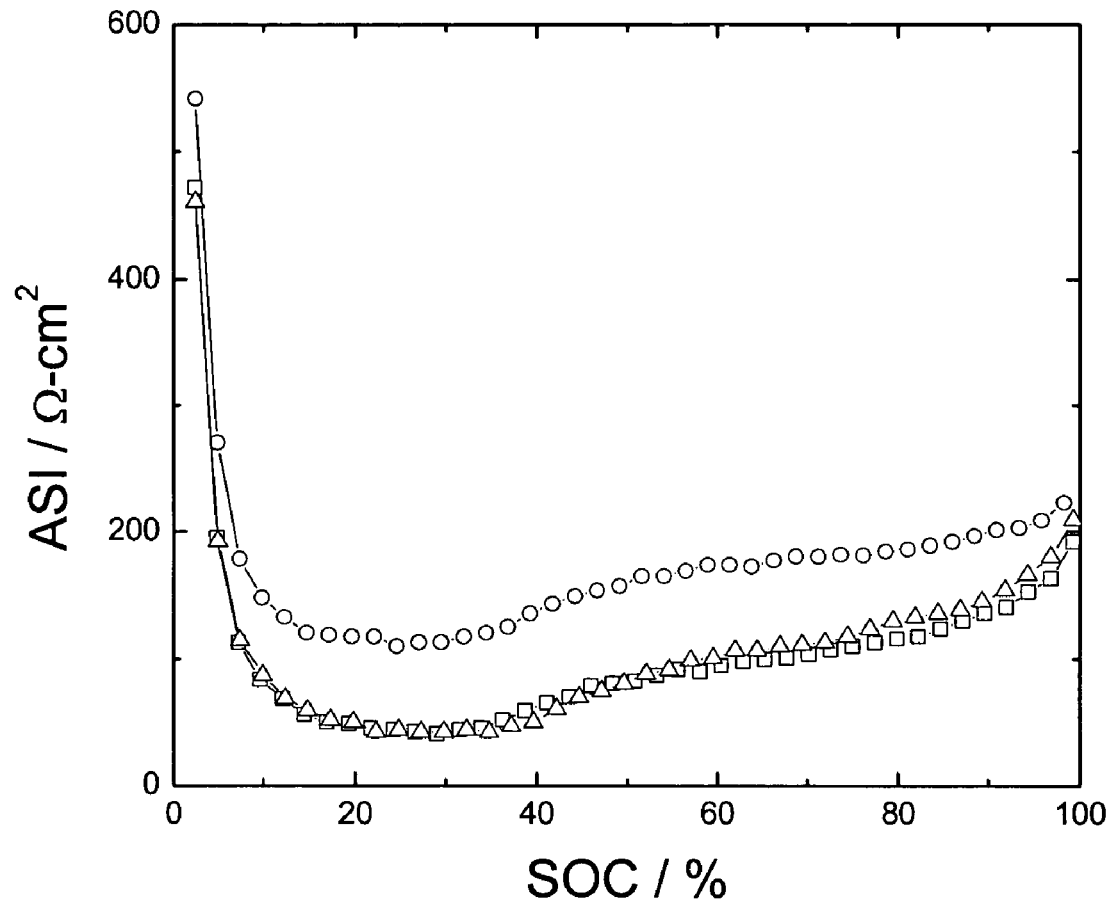
Figure 17. The area specific impedance of
C/Li$_{1+x}$(Ni$_\alpha$Mn$_\beta$Co$_\gamma$)O$_{2-z}$F$_z$ cells as a function of SOC.
—○— x=0.2, α=0.15, β=0.55, γ=0.1, z=0;
—□— x=0.2, α=0.16, β=0.54, γ=0.1, z=0.02;
—△— x=0.2, α=0.175, β=0.525, γ=0.1, z=0.05.

LAYERED CATHODE MATERIALS FOR LITHIUM ION RECHARGEABLE BATTERIES

CROSS-REFERENCE TO RELATED PATENT APPLICATIONS

This application claims the benefit under 35 U.S.C. 119(e) U.S. Provisional Patent Application No. 60/423,347, filed Nov. 1, 2002, incorporated herein by reference in its entirety.

This invention was made with government support under Contract No. W-31-109-ENG-38 awarded to the Department of Energy. The Government has certain rights in this invention.

BACKGROUND OF THE INVENTION $Li(Mn_{0.5}Ni_{0.5})O_2$ is a promising cathode material for Li-ion rechargeable batteries due to its lower cost, improved thermal safety performance, and lower toxicity compared with $LiNiO_2$ and $LiCoO_2$. However, $Li(Mn_{0.5}Ni_{0.5})O_2$ exhibits rather small capacity for high-energy applications and rather high impedance for high-power applications.

A need therefore remains for an improved layered cathode material for use with lithium ion rechargeable batteries.

SUMMARY OF THE INVENTION

It is therefore an object of the present invention to provide an improved cathode for rechargeable batteries that possesses improved impedance characteristics.

It is another object of the present invention to provide an improved cathode for rechargeable batteries that possesses improved stability of the layered oxide structure during electrochemical cycling.

It is still another object of the present invention to provide an improved cathode for rechargeable batteries that possesses improved capacity characteristics.

In accordance with the above objects, a number of materials with composition $Li_{1+x}Ni_\alpha Mn_\beta Co_\gamma M'_\delta O_{2-z}F_z$ (M'=Mg, Zn,Al,Ga,B,Zr,Ti) have been developed for use with rechargeable batteries, wherein x is between about 0 and 0.3, $\alpha$ is between about 0.2 and 0.6, $\beta$ is between about 0.2 and 0.6, $\gamma$ is between about 0 and 0.3, $\delta$ is between about 0 and 0.15, and z is between about 0 and 0.2. Surface-coated $Li_{1+x}Ni_\alpha Mn_\beta Co_\gamma M'_\delta O_{2-z}F_z$ (M'=Mg,Zn,Al,Ga,B,Zr,Ti) has also been developed, wherein x is between about 0 and 0.3, $\alpha$ is between about 0.2 and 0.6, $\beta$ is between about 0.2 and 0.6, $\gamma$ is between about 0 and 0.3, $\delta$ is between about 0 and 0.15, and z is between about 0 and 0.2. Extensive testing has been conducted to investigate the effect of adding the above metal and fluorine dopants and the surface modification on capacity, impedance, and stability of the layered oxide structure during electrochemical cycling.

BRIEF DESCRIPTION OF THE DRAWINGS

FIG. 5 is a plot showing the first charge/discharge curves of $Li/Li(Ni_\alpha Mn_\beta Co_\gamma)O_{2-z}F_z$ cells;

FIG. 6 is a plot showing the cycling performance of $Li/Li(Ni_\alpha Mn_\beta Co_\gamma)O_{2-z}F_z$ cells;

FIG. 7 is a plot showing the area specific impedance of $C/Li(Ni_\alpha Mn_\beta)O_{2-z}F_z$ cells as a function of state of charge measured by 30 s-current interruption;

FIG. 8 is a plot showing the variation of the area specific impedance values at 50% state of charge of $C/Li(Ni_\alpha Mn_\beta)O_{2-z}F_z$ cells;

FIGS. 9 and 10 show the cycling performance of uncoated $Li(Ni_\alpha Mn_\beta Co_\gamma)O_2$, $Li(Ni_\alpha Mn_\beta Co_\gamma)O_2$ coated with 0.5 wt % Al-isopropoxide, and $Li(Ni_\alpha Mn_\beta Co_\gamma)O_2$ coated with 1.0 wt % Al-isopropoxide at room temperature and 55° C., respectively;

FIG. 11 shows the variation of area specific impedance (ASI) with cycling of $C/Li(Ni_\alpha Mn_\beta Co_\gamma)O_2$ measured by a 30 s current interruption method;

FIG. 12 shows the a.c. impedance spectroscopy of $C/Li(Ni_\alpha Mn_\beta Co_\gamma)O_2$ cells as a function of cycle number measured with $C/Li(Ni_\alpha Mn_\beta Co_\gamma)O_2$ cells;

FIG. 13 presents the variation of area specific impedance at 60% SOC with a 55° C.-storage time measured with $C/Li(Ni_\alpha Mn_\beta Co_\gamma)O_2$ cells;

FIG. 14 is a plot showing the first charge/discharge curves and variation of discharge capacity with cycle number of $Li/Li_{1+x}(Ni_\alpha Mn_\beta Co_\gamma)O_2$ cells;

FIG. 15 is a plot showing the area specific impedance of $C/Li_{1+x}(Ni_\alpha Mn_\beta Co_\gamma)O_2$ cells as a function of state of charge measured by a 30 s current interruption method;

FIG. 16 is a plot showing the cycling performance of $Li/Li_{1+x}(Ni_\alpha Mn_\beta Co_\gamma)O_{2-z}F_z$ cells at room temperature and at 55° C.; and FIG. 17 is a plot showing the area specific impedance of $Li/Li_{1+x}(Ni_\alpha Mn_\beta Co_\gamma)O_{2-z}F_z$ cells measured by a 30 s current interruption method.

DETAILED DESCRIPTION OF THE PREFERRED EMBODIMENTS

Figure 1A:
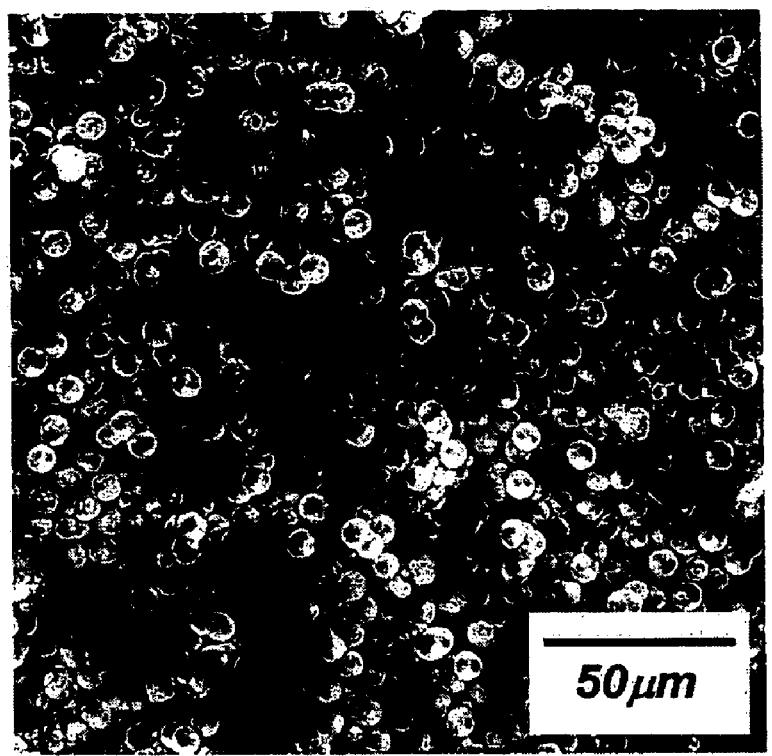
FIGS. 1(a)–1(c) show the morphology of $(Ni_\alpha Mn_\beta Co_\gamma)$-carbonate prepared by a co-precipitation method using ammonium hydrogen carbonate using magnification factors of ×500, ×2,000, and ×12,000, respectively.

The present invention presents layered lithium nickel manganese oxide cathode materials for lithium secondary batteries such as: (1) cathode materials doped with fluorine on oxygen sites to reduce impedance and to improve cycling stability at high temperature as well as at room temperature; (2) cathode materials doped with various metal ions on transition metal site to stabilize layered structure, suppress cation mixing and, consequently, improve electrochemical properties; lithium, cobalt, magnesium, zinc, aluminum, gallium, boron, zirconium, and titanium ions were chosen for the latter purposes; and (3) cathode materials surface-coated to improve cycling/power performance and thermal safety, wherein the coating element of the coating material source is at least one element selected from the group consisting of Al, Bi, Ga, Ge, In, Mg, Pb, Si, Sn, Ti, Tl, Zn, Zr. Either a solid-state reaction method or an aqueous solution method or a sol-gel method may be employed for the preparation of the compounds $Li_{1+x}Ni_\alpha Mn_\beta Co_\gamma M'_\delta O_{2-z}F_z$ with the value M'=Mg,Zn,Al,Ga,B,Zr,Ti Ti and in another embodiment $Li_{1+x}Ni_\alpha Mn_\beta Co_\gamma M'_\delta O_{2-z}X_z$ (M'=Mg, Zn,Al,Ga,B,Zr,Ti; X=F,S,Cl,I).

For the solid state reaction method, (Ni,Mn,Co)-hydroxides or (Ni, Mn,Co)-carbonates may be prepared by a co-precipitation method. For preparation of (Ni,Mn,Co)-hydroxides, appropriate amount of $NiSO_4$ [or $Ni(CH_3CO$ O)$_2$.xH$_2$O or Ni(NO$_3$)$_2$.xH$_2$O], MnSO$_4$ [or Mn(CH$_3$CO O)$_2$.xH$_2$O or Mn(NO$_3$)$_2$.xH$_2$O], and CoSO$_4$ [or Co(CH$_3$COO)$_2$.xH$_2$O or Co(NO$_3$)$_2$.xH$_2$O] are dissolved in distilled water, and the solution is added to another solution of ammonium hydroxide (NH$_4$OH) and sodium hydroxide (NaOH) with a pH=10~12. During the co-precipitation process, the pH of the overall solution is kept at 10~12 using NaOH. For preparation of (Ni,Mn,Co)carbonates, appropriate amount of NiSO$_4$ [or Ni(CH$_3$COO)$_2$.xH$_2$O or Ni(NO$_3$)$_2$.xH$_2$O], MnSO$_4$ [or Mn(CH$_3$COO)$_2$.xH$_2$O or Mn(NO$_3$)$_2$.xH$_2$O], and CoSO$_4$ [or Co(CH$_3$COO)$_2$.xH$_2$O or Co(NO$_3$)$_2$.xH$_2$O] are dissolved in distilled water, and the solution is added to another aqueous solution of ammonium hydrogen carbonate [(NH$_4$)HCO$_3$]. During the co-precipitation process, the temperature of the overall solution is kept at 40–70° C. The co-precipitated powders are filtered and dried. To prepare a Li$_{1+x}$Ni$_\alpha$Mn$_\beta$Co$_\gamma$M'$_\delta$O$_{2-z}$F$_z$ (M'=Mg,Zn, Al,Ga,B,Zr,Ti) compound, appropriate amounts of lithium hydroxide (or lithium carbonate), lithium fluoride, (Ni,Mn,Co)-hydroxide [or (Ni,Mn,Co)-carbonate], and M'-hydroxides (or M'-oxides) are mixed. The mixed powders are calcined at 450~550° C. for 12–30 hours in air and then at 900–1000° C. for 10–24 hours either in air or in an oxygen-containing atmosphere.

For the aqueous solution method, appropriate amounts of lithium hydroxide, lithium fluoride, nickel hydroxide, cobalt hydroxide, and M'-hydroxide (or M'-nitrate) are dissolved in distilled water whose pH is adjusted with nitric acid. An aqueous solution of manganese acetate is added to the above solution. The mixed solution is refluxed in a round bottom flask attached with a condenser at 80° C. for about 12–24 hours and evaporated in a rotary vacuum evaporator. Organic contents in the gel precursor are eliminated at 400° C. for 2 hours. Finally, the resulting powder is calcined at 900–1000° C. for about 10–24 hours either in air or in an oxygen-containing atmosphere.

For the sol-gel method, appropriate amounts of lithium acetate, lithium fluoride, nickel acetate, manganese acetate, cobalt acetate, and M'-acetate are dissolved in distilled water and added to a glycolic/tartaric acid solution that is used as a chelating agent. The solution pH is adjusted to around 7 using ammonium hydroxide. The entire process is conducted under continuous stirring and heating on a hot plate. The resulting gel precursor is decomposed at 450° C. for 5 hours in air. The decomposed powders are then fired at about 900–1000° C. for about 10–24 hours either in air or in an oxygen-containing atmosphere.

For the surface-coating of the synthesized compound Li$_{1+x}$Ni$_\alpha$Mn$_\beta$Co$_\gamma$M'$_\delta$O$_{2-z}$F$_z$, coating solutions are prepared by dissolving coating material sources in organic solvents or water. The coating material sources include A'-alkoxide, A'-salt or A'-oxide, where A' includes Al, Bi, Ga, Ge, In, Mg, Pb, Si, Sn, Ti, Tl, Zn, Zr or mixtures thereof. The coating solutions are mixed with the synthesized compound Li$_{1+x}$Ni$_\alpha$Mn$_\beta$Co$_\gamma$M'$_\delta$O$_{2-z}$F$_z$ by an impregnation method such as dip coating. The amount of coating material sources may be between about 0.05 and 10 weight percent of Li$_{1+x}$Ni$_\alpha$Mn$_\beta$Co$_\gamma$M'$_\delta$O$_{2-z}$F$_z$. Thereafter, the surface-coated Li$_{1+x}$Ni$_\alpha$Mn$_\beta$Co$_\gamma$M'$_{67}$O$_{2-z}$F$_z$ powder is dried at temperatures between about 25° C. and 700° C. for approximately 1 to 24 hours.

The synthesized compound is mixed with a carbon additive and a PVDF binder to form a laminate film on an aluminum foil. This laminate is used for electrochemical testing in the presence of lithium or carbon counter electrodes and non-aqueous electrolytes made of LiPF$_6$/EC: DEC (1:1).

Figure 1B:
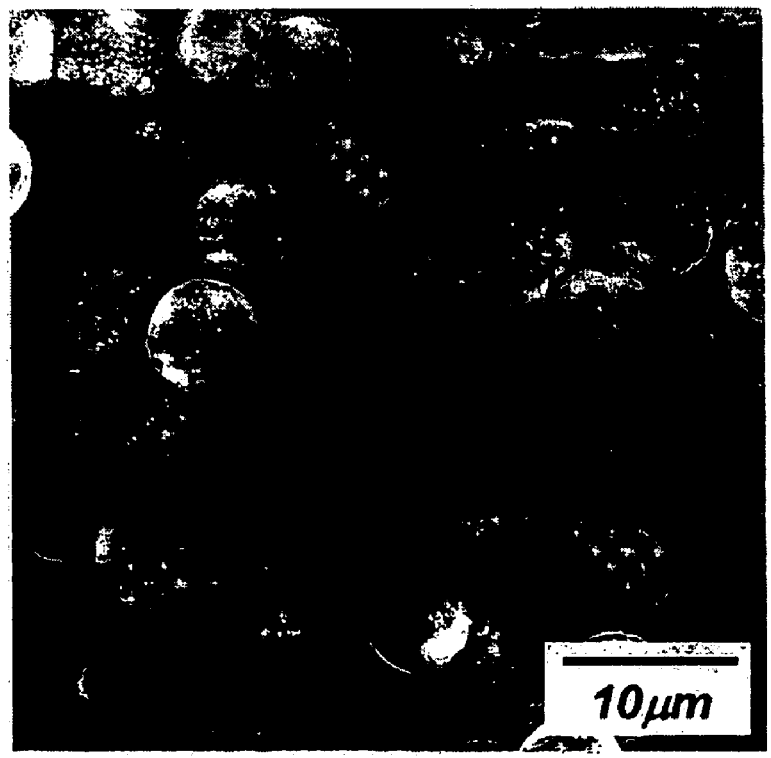
Figure 1C:
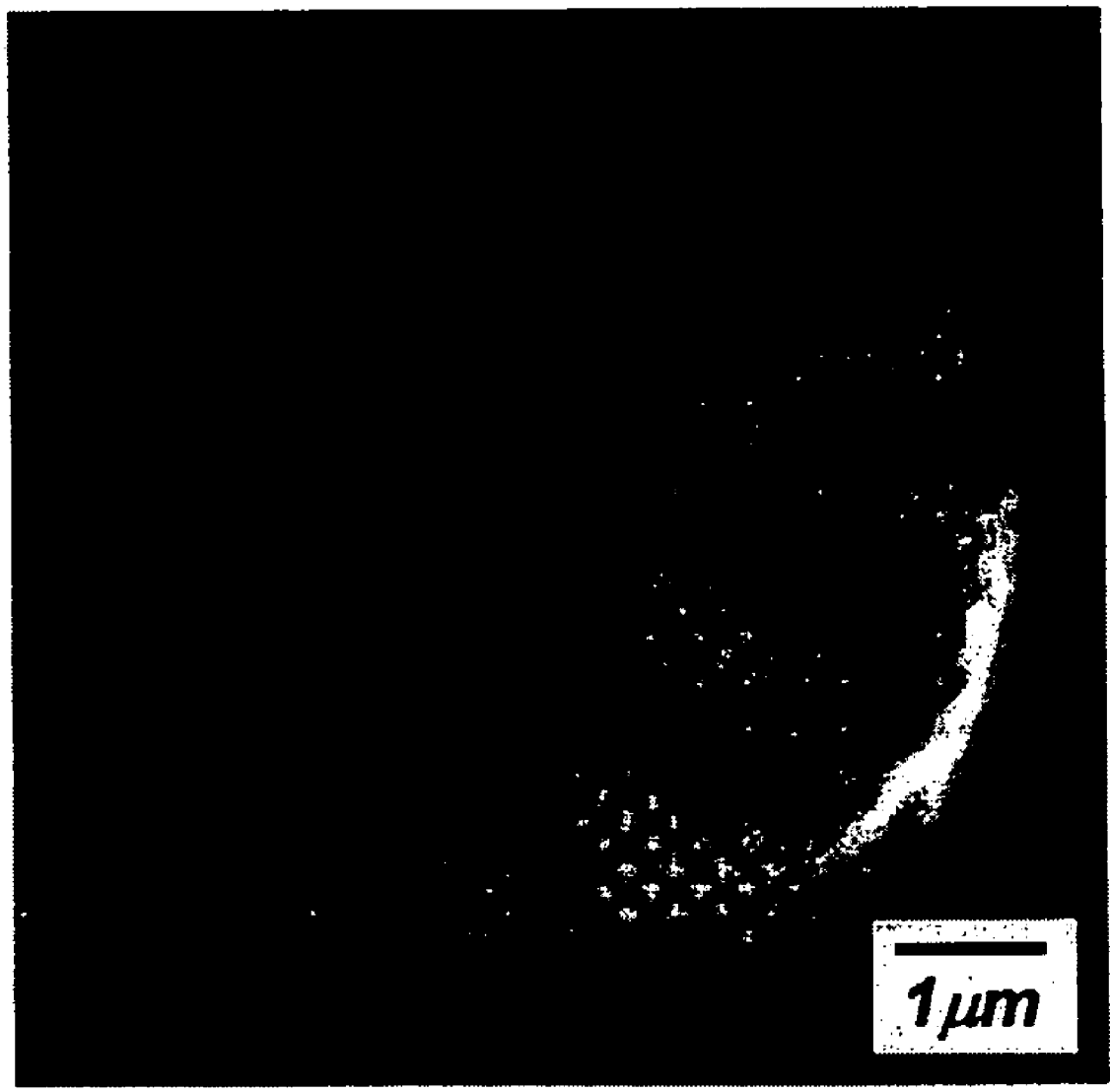

FIGS. 1(a)–1(c) show the morphology of (Ni$_\alpha$Mn$_\beta$Co$_\gamma$)-carbonate prepared by the co-precipitation method using ammonium hydrogen carbonate. Spherical shape precursors with homogeneous size distribution are obtained by the co-precipitation. The magnification factors of FIGS. 1(a), 1(b), and 1(c) are ×500, ×2,000, and ×12,000, respectively.

Figure 2A:
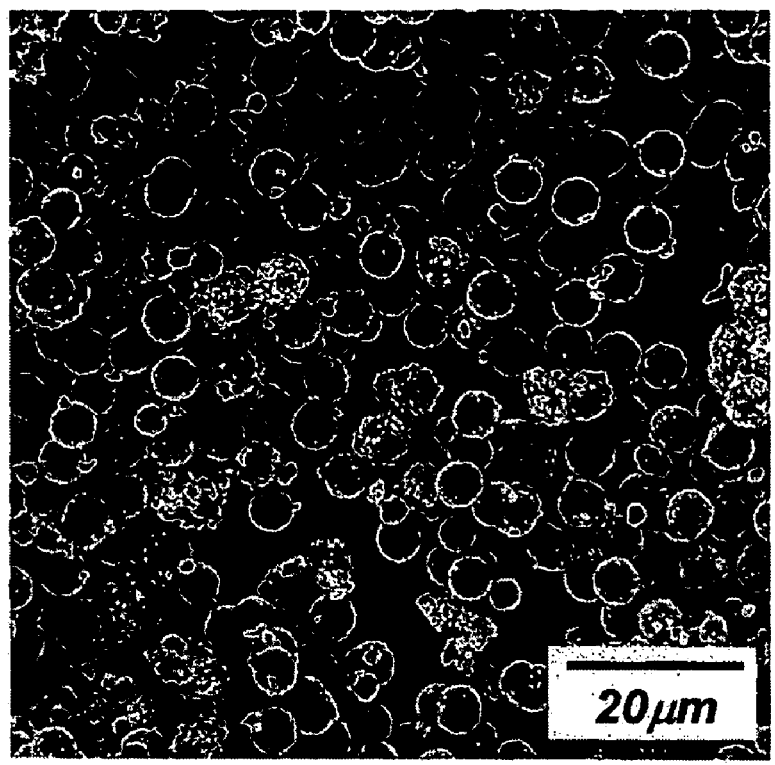
FIGS. 2(a)–2(c) show the morphology of $Li_{1+x}Ni_\alpha Mn_\beta Co_\gamma O_2$ prepared by calcinations of $(Ni_\alpha Mn_\beta Co_\gamma)$-carbonate and lithium carbonate at 1000° C. for 10 h in air, using magnification factors of ×1,000, ×2,000, and ×12,000, respectively.
Figure 2B:
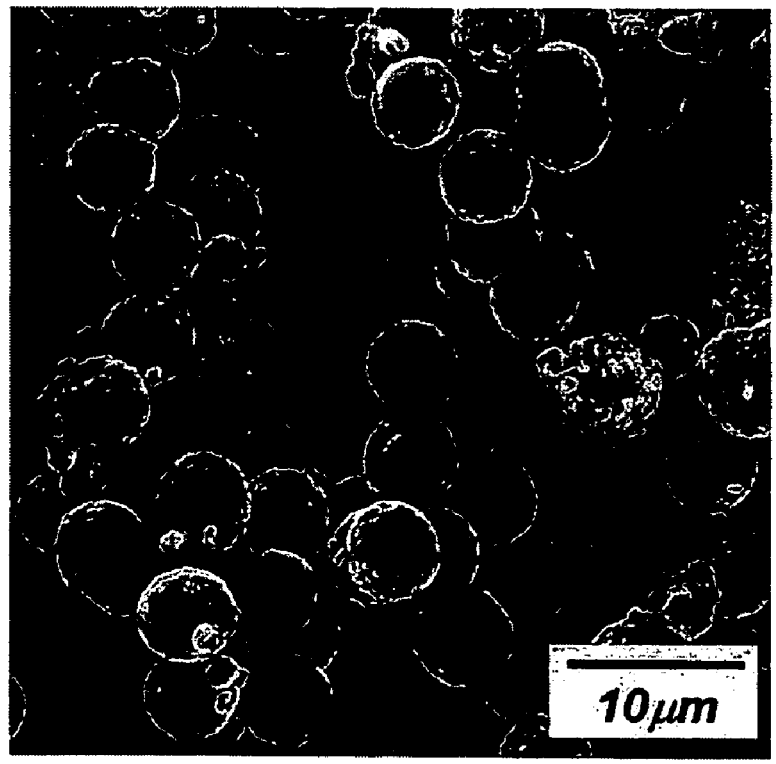
Figure 2C:
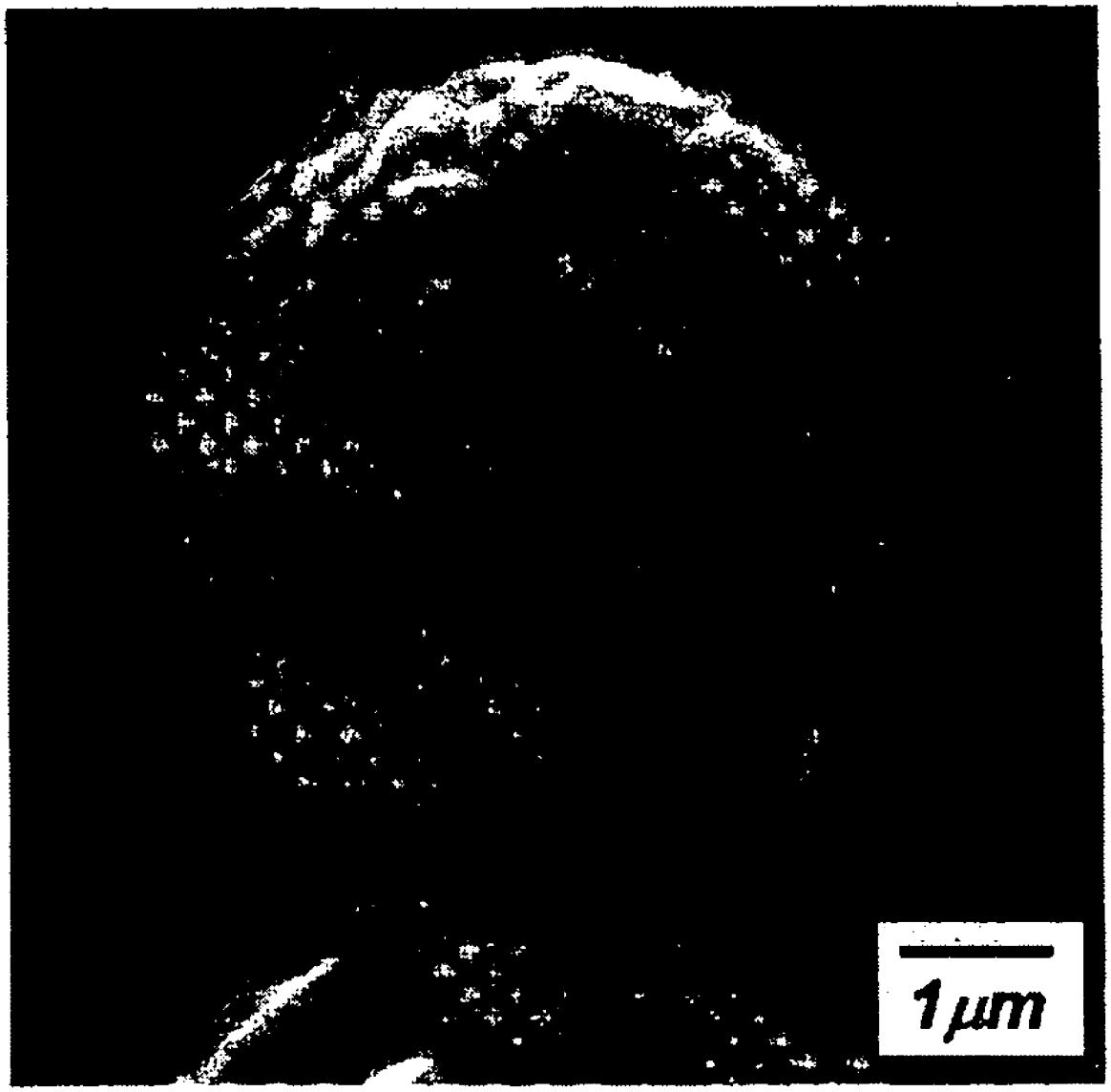

FIGS. 2(a)–2(c) show the morphology of Li$_{1+x}$Ni$_\alpha$Mn$_\beta$Co$_\gamma$O$_2$ prepared by calcinations of (Ni$_\alpha$Mn$_\beta$Co$_\gamma$)-carbonate and lithium carbonate at 1000° C. for 10 h in air. The spherical shape of the precursor is preserved after calcinations. The magnification factors of FIGS. 2(a), 2(b) and 2(c) are ×1,000, ×2,000, and ×12,000, respectively.

Figure 3:
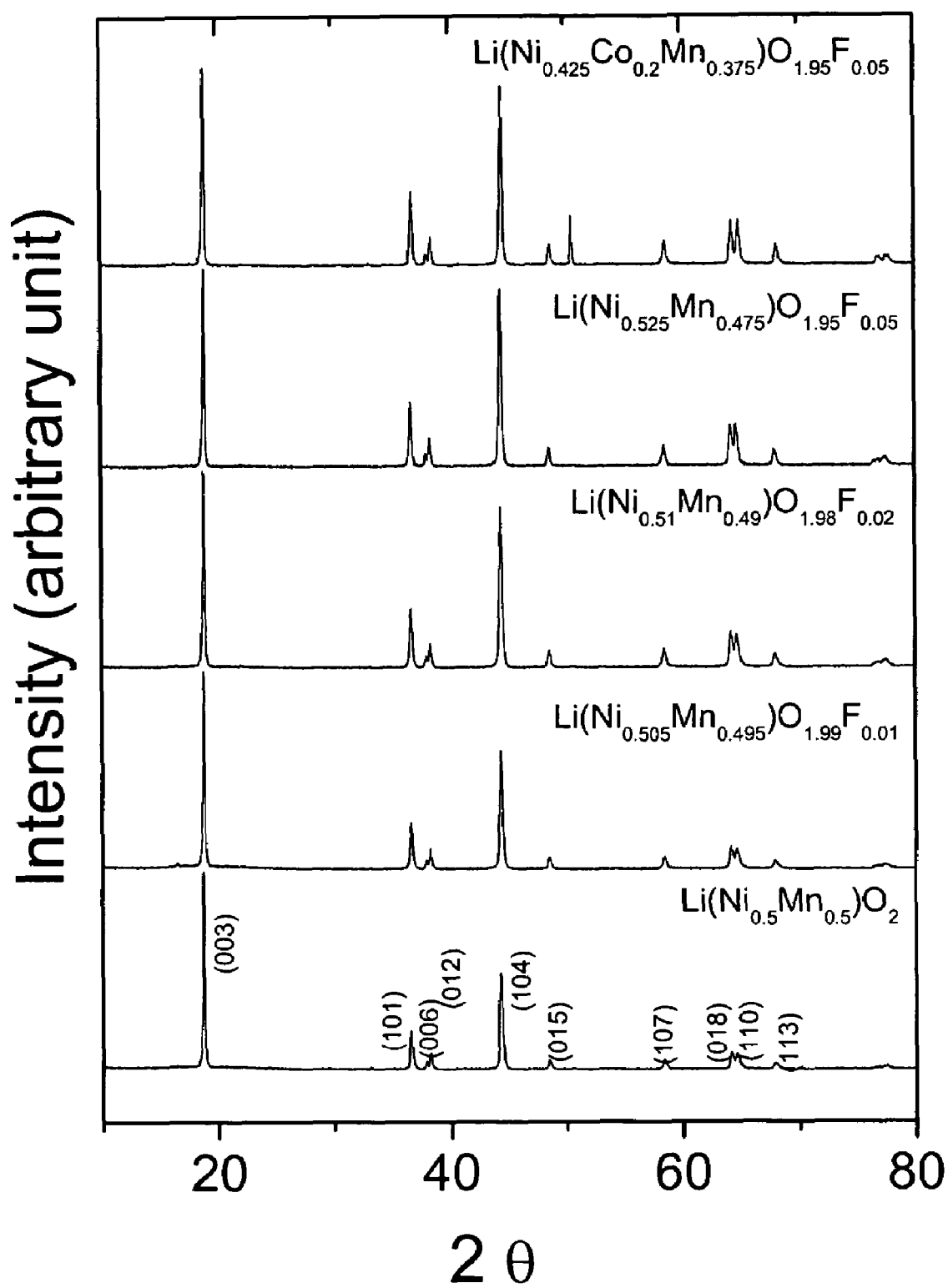
FIG. 3 and FIG. 4 are plots showing the X-ray diffraction patterns of various $Li_{1+x}Ni_\alpha Mn_\beta Co_\gamma M'_\delta O_{2-z}F_z$ compounds.
Figure 4:
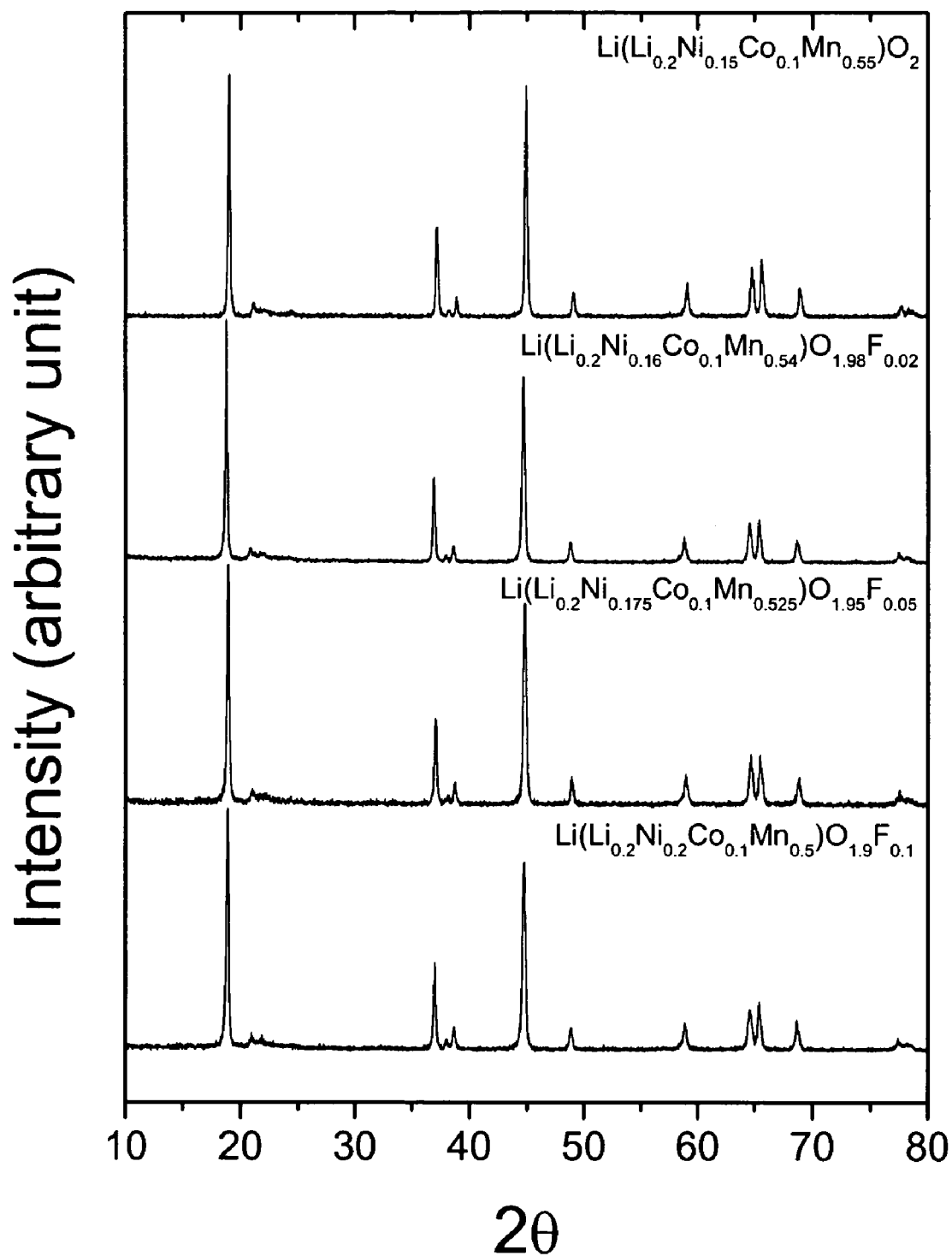

FIGS. 3 and 4 represent X-ray diffraction patterns of Li$_{1+x}$Ni$_\alpha$Mn$_\beta$Co$_\gamma$M'$_\delta$O$_{2-z}$F$_z$ compounds. All of the compounds exhibit the ordered rock-salt structure with crystallographic structure of R$\bar{3}$m. For the Li-excess composition such as Li(Li$_{0.2}$Ni$_{0.2+0.5z}$Co$_{0.1}$Mn$_{0.5-0.5z}$)O$_{2-z}$F$_z$, extra peaks appear at 20~25°, as shown in FIG. 4, which are generally attributed to cation ordering in the transition metal layer.

FIG. 5 shows the first charge/discharge curves of Li/Li (Ni$_\alpha$Mn$_\beta$Co$_\gamma$)O$_{2-z}$F$_z$ cells, and FIG. 6 shows cycling performance of Li/Li(Ni$_\alpha$Mn$_\beta$Co$_\gamma$)O$_{2-z}$F$_z$ cells. FIGS. 5 and 6 clearly show that the discharge capacity increases by more than 10%, and the cycling performance improves by the simultaneous substitution of cations and anions.

FIG. 7 shows area specific impedance (ASI) of C/Li (Ni$_\alpha$Mn$_\beta$)O$_{2-z}$F$_z$ cells as a function of state of charge (SOC) measured by 30 s-current interruption. FIG. 8 shows the variation of the ASI values at 50% SOC of C/Li(Ni$_\alpha$Mn$_\beta$)O$_{2-z}$F$_z$ cells. FIGS. 7 and 8 clearly show that fluorine doping lowers impedance and enhances cycling stability.

FIGS. 9 and 10 show the cycling performance of uncoated Li(Ni$_\alpha$Mn$_\beta$Co$_\gamma$)O$_2$, Li(Ni$_\alpha$Mn$_\beta$Co$_\gamma$)O$_2$ coated with 0.5 wt % Al-isopropoxide, and Li(Ni$_\alpha$Mn$_\beta$Co$_\gamma$)O$_2$ coated with 1.0 wt % Al-isopropoxide at room temperature and 55° C., respectively. The coating solution is prepared by dissolving appropriate amount of Al-isopropoxide in ethanol. Li(Ni$_\alpha$Mn$_\beta$Co$_\gamma$) O$_2$ powders are then mixed thoroughly with the coating solution and dried at 100° C. for 12 h. The coated powders are subsequently heat-treated at 300° C. for 3 h in air. For FIG. 9, the data identified under group (a), α=0.4, β=0.4, γ=0.2, with the Li(Ni$_\alpha$Mn$_\beta$Co$_\gamma$)O$_2$ uncoated. For the data identified under group (b), α=0.4, β=0.4, γ=0.2, and the Li(Ni$_\alpha$Mn$_\beta$Co$_\gamma$)O$_2$ is coated with 0.5 wt % Al-isopropoxide. For the data identified under group (c), α=0.4, β=0.4, γ=0.2, and the Li(Ni$_\alpha$Mn$_\beta$Co$_\gamma$)O$_2$ is coated with 1.0 wt % Al-isopropoxide. In FIG. 10, for the data identified under group (a), α=0.4, β=0.4, γ=0.2, with the Li(Ni$_\alpha$Mn$_\beta$Co$_\gamma$)O$_2$ uncoated. For the data identified under group (b), α=0.4, β=0.4, γ=0.2, and the Li(Ni$_\alpha$Mn$_\beta$Co$_\gamma$)O$_2$ is coated with 0.5 wt % Al-isopropoxide.

FIG. 11 shows the variation of area specific impedance (ASI) with cycling of C/Li(Ni$_\alpha$Mn$_\beta$Co$_\gamma$)O$_2$ measured by a 30 s current interruption method with C/Li(Ni$_\alpha$Mn$_\beta$Co$_\gamma$)O$_2$ cells. The cells with coated cathode materials exhibit a very limited increase of ASI, whereas the cells with uncoated cathode material show a large impedance increase with cycling.

FIG. 12 shows the a.c. impedance spectroscopy of C/Li (Ni$_\alpha$Mn$_\beta$Co$_\gamma$)O$_2$ cells as a function of cycle number measured with C/Li(Ni$_\alpha$Mn$_\beta$Co$_\gamma$)O$_2$ cells. This representation indicates the surface coating significantly improves the stability of the cathode surface/electrolyte interface. In FIGS. 11 and 12, for the data identified under chart (a), α=0.4, β=0.4, γ=0.2, with the Li(Ni$_\alpha$Mn$_\beta$Co$_\gamma$)O$_2$ uncoated. For the data identified under chart (b), α=0.4, β=0.4, γ=0.2, and the Li(Ni$_\alpha$Mn$_\beta$Co$_\gamma$)O$_2$ is coated with 0.5 wt % Al-isopropoxide. For the data identified under chart (c), α=0.4, β=0.4, γ=0.2, and the Li(Ni$_α$Mn$_β$Co$_γ$)O$_2$ is coated with 1.0 wt % Al-isopropoxide.

FIG. 13 presents the impedance variation with a 55° C.-storage time measured with C/Li(Ni$_α$Mn$_β$Co$_γ$)O$_2$ cells. For the data identified under group (a), α=0.4, β=0.4, γ=0.2, with the Li(Ni$_α$Mn$_β$Co$_γ$)O$_2$ uncoated. For the data identified under group (b), (α=0.4, β=0.4, γ=0.2, and the Li(Ni$_α$Mn$_β$Co$_γ$)O$_2$ is coated with 0.5 wt % Al-isopropoxide. For the data identified under group (c), α=0.4, β=0.4, γ=0.2, and the Li(Ni$_α$Mn$_β$Co$_γ$)O$_2$ is coated with 1.0 wt % Al-isopropoxide. FIGS. 9–13 clearly show the surface coating greatly improving the cycle life, as well as calendar life, of the lithium-ion cells.

FIG. 14 shows the first charge/discharge curves and variation of discharge capacity with cycle number of Li/Li$_{1+x}$(Ni$_α$Mn$_β$Co$_γ$)O$_2$ cells. FIG. 15 shows the area specific impedance of C/Li$_{1+x}$(Ni$_α$Mn$_β$Co$_γ$)O$_2$ cells as a function of state of charge measured by a 30 s current interruption method.

FIG. 16 shows cycling performance of Li/L$_{1+x}$(Ni$_α$Mn$_β$Co$_γ$)O$_{2-z}$F$_z$ cells at room temperature and at 55° C. FIG. 17 shows the area specific impedance of Li/Li$_{1+x}$(Ni$_α$Mn$_β$Co$_γ$)O$_{2-z}$F$_z$ cells measured by a 30 s current interruption method.

FIGS. 14–17 clearly show that substitution of oxygen with fluorine significantly improves cycling performance and lowers the impedance of the cathode materials.

The materials described herein can be used as cathodes in lithium-ion rechargeable batteries for products such as electric vehicles, hybrid electric vehicles, portable electronics, and a variety of other products. The materials described herein are less expensive and thermally safer than existing cathode materials such as LiCoO$_2$ and LiNiO$_2$. The materials of the present invention also exhibit improved calendar/cycle life when compared to existing cathode materials.

It should be understood that the above description of the invention and specific examples and embodiments, while indicating the preferred embodiments of the present invention are given by demonstration and not limitation. Many changes and modifications within the scope of the present invention may therefore be made without departing from the spirit thereof and the present invention includes all such changes and modifications.

What is claimed is:

1. A positive electrode material of substituted lithium nickel-manganese oxides for a non-aqueous lithium cell, comprising a composition of Li$_{1+x}$Ni$_α$Mn$_β$Co$_γ$M'$_δ$O$_{2-z}$X$_z$ wherein M' is selected from the group consisting essentially of Mg, Zn, Al, Ga, B, Zr, and Ti, wherein X is selected from the group consisting essentially of F, Cl and I, wherein x is between a value greater than 0 and about 0.333, α is between about 0.2 and 0.6, β is between about 0.2 and 0.667, γ is between a value greater than 0 and about 0.333, δ is between a value greater than 0 and about 0.2, and z is between a value greater than 0 and about 0.5.

2. The positive electrode material of claim 1, wherein the composition comprises Li$_{1+x}$Ni$_α$Mn$_β$O$_{2-z}$F$_z$, and wherein x is between about a value greater than and about 0.333, α is between about 0.2 and 0.6, β is between about 0.2 and 0.667, and z is between about a value greater than 0 and about 0.5.

3. The positive electrode material, of claim 1, wherein the composition comprises Li$_{1+x}$Ni$_α$Mn$_β$Co$_γ$O$_{2-z}$F$_z$, and wherein x is between about a value greater than 0 and about 0.333, α is between about 0.2 and 0.6, β is between about 0.2 and 0.667, γ is between about 0.01 and 0.333, and z is between about a value greater than 0 and about 0.5.

4. The positive electrode material, of claim 1, wherein the composition comprises Li$_{1+x}$Ni$_α$Mn$_β$Al$_δ$O$_{2-z}$F$_z$, and wherein x is between about a value greater than 0 and about 0.333, α is between about 0.2 and 0.6, β is between about 0.2 and 0.667, δ is between about 0.01 and 0.2, and z is between about a value greater than 0 and about 0.5.

5. The positive electrode material of claim 1, wherein the composition comprises Li$_{1-x}$Ni$_α$Mn$_β$Ti$_δ$O$_{2-z}$F$_z$, wherein x is between about a value greater than 0 and about 0.333, α is between about 0.2 and 0.6, β is between about 0.2 and 0.667, δ is between about 0.01 and 0.2, and z is between about a value greater than 0 and about 0.5.

6. The positive electrode material of claim 1, wherein the composition comprises Li$_{1+x}$Ni$_α$Mn$_β$Co$_γ$Al$_δ$O$_{2-z}$F$_z$, and wherein x is between about a value greater than 0 and about 0.333, α is between about 0.2 and 0.6, β is between about 0.2 and 0.667, γ is between about 0.01 and 0.333, δ is between about 0.01 and 0.2, and z is between about a value greater than 0 and about 0.5.

7. The positive electrode material of claim 1, wherein the composition comprises Li$_{1+x}$Ni$_α$Mn$_β$Co$_γ$Ti$_δ$O$_{2-z}$F$_z$, and wherein x is between about a value greater than 0 and about 0.333, α is between about 0.2 and 0.6, β is between about 0.2 and 0.667, γ is between about 0.01 and 0.333, δ is between about 0.01 and 0.2, and z is between about a value greater than 0 and about 0.5.

8. The electrode material of claim 1, wherein the electrode material is formed by a solid state reaction process.

9. The electrode material of claim 1, wherein the electrode material is formed by an aqueous solution based process.

10. The electrode material of claim 1, wherein the electrode material is formed by a sol-gel process.

11. The electrode material of claim 9, wherein the electrode material prepared by the steps of:
dissolving appropriate amounts of lithium hydroxide, lithium fluoride, nickel hydroxide, cobalt hydroxide, and M'-hydroxide or M'-nitrate; wherein M' is selected from the group consisting essentially of Mg, Zn, Al, and Ga in distilled water whose pH was adjusted with nitric acid to form a first solution;
adding an aqueous solution of manganese acetate to the first solution to form a second solution;
refluxing the second solution in a flask attached with a condenser at about 80° C. for about 12–24 hours;
evaporating the second solution in a rotary vacuum evaporator to form a gel precursor;
eliminating organic contents from the gel precursor at about 400° C. for about 2 hours to form a powder; and
calcining the powder at about 900–1000° C. for about 10–24 hours in either an air or an oxygen containing atmosphere.

12. The electrode material of claim 10, wherein the electrode material prepared by the steps of:
dissolving appropriate amounts of lithium acetate, lithium fluoride, nickel acetate, manganese acetate, cobalt acetate, and M'-acetate or M'-nitrate; wherein M' is selected from the group consisting essentially of Mg, Zn, Al, and Ga in distilled water to form a first solution;
added the first solution to a glycolic/tartaric acid solution that is used as a chelating agent to form a second solution;
adjusting the pH of the second solution to about 7 using ammonium hydroxide, resulting in a gel precursor;
decomposing the gel precursor at about 4500 C for about 5 hours in air to form a decomposed power; and firing the decomposed powder at about 900–1000° C. for about 10–24 hours in an air or an oxygen containing atmosphere, wherein the dissolving, adding, and adjusting steps occur under continuous stirring and heating.

13. The electrode material of claim 9, wherein the electrode material is prepared by the steps of:
mixing appropriate amounts of lithium hydroxide (or lithium carbonate), lithium fluoride, (Ni,Mn,Co)-hydroxide [or (Ni,Mn,Co)-carbonate], M'-hydroxide (or M' oxide; wherein M' is selected from the group consisting essentially of Mg, Zn, Al, Ga, B, Zr, and Ti);
calcined the mixed materials at about 450~550° C. for about 12–30 hours in air; and calcining the mixed materials at about 900–1000° C. for about 10–24 hours either in air or in an oxygen-containing atmosphere.

14. A non-aqueous lithium cell comprising:
a negative electrode;
a non-aqueous electrolyte; and
a positive electrode,
wherein the positive electrode has a composition of $Li_{1+x}Ni_aMn_bCo_cM'_\delta O_{2-z}X_z$ wherein M' is selected from the group consisting essentially of Mg, Zn, Al, Ga, B, Zr, and Ti, wherein X is selected from the group consisting essentially of F, Cl and I, wherein x is between a value greater than 0 and about 0.333, α is between about 0.2 and 0.6, b is between about 0.2 and 0.667, c is between a value greater than 0 and about 0.333, δ is between a value greater than 0 and about 0.2, and z is between a value greater than 0 and about 0.5, and wherein oxidation states of Ni, Mn, and Co are $Ni^{2+}$, $Mn^{4+}$, and $Co^{3+}$, respectively.

15. A positive electrode material made of substituted lithium nickel-manganese oxides for non-aqueous lithium cell, comprising:
a composition of $Li_{1+x}Ni_\alpha Mn_\beta Co_c M'_\delta O_{2-z}X_z$, wherein M' is selected from the group consisting essentially of Mg, Zn, Al, Ga, B, Zr and Ti wherein X is selected from the group consisting essentially of F, Cl and I, wherein x, α, β, c, δ, and z are a value greater than 0 and are controlled so as to fix the oxidation states of Ni, Mn, and Co as $Ni^{2+}$, $Mn^{4+}$, and $Co^{3+}$, respectively.

16. A positive active material for a secondary lithium cell, comprising:
a core comprising at least one composition of $Li_{1+x}Ni_\alpha Mn_\beta Co_\gamma M'_\delta O_{2-z}X_z$ wherein M' is selected from the group consisting essentially of Mg, Zn, Al, Ga, B, Zr, and Ti, wherein X is selected from the group consisting essentially of F, Cl and I, wherein x is between a value greater than 0 and about 0.333, α is between about 0.2 and 0.6, β is between about 0.2 and 0.667, γ is between a value greater than 0 and about 0.333, δ is between a value greater than 0 and about 0.2, and z is between a value greater than 0 and about 0.5; and
either a surface layer or a surface phase on the core, comprising at least one surface coating material from a coating material source selected from the group consisting of alkoxides, hydroxides, oxides and mixtures thereof,
wherein the surface-coated compound is heat-treated to form hydroxides or amorphous oxides on the compound surface.

17. The positive active material of claim 16, wherein the amount of the surface coating material source is between about 0.05 and 10 percent by weight based upon the weight of the positive active material.

18. The positive active material of claim 16, wherein the coating element of the surface coating material source comprises at least one element selected from the group consisting of Al, Bi, Ga, Ge, In, Mg, Pb, Si, Sn, Ti, Tl, Zn, Zr.

19. The positive active material of claim 18, wherein the surface coating material source comprises Al-isopropoxide, zinc methoxide or indium-isopropoxide and is dissolved in ethanol.

20. The positive active material of claim 16, wherein the heat-treating process is carried out at a temperature ranging from about 100 to 500° C. for a duration ranging from about 1 to 24 hours.

* * * * *

UNITED STATES PATENT AND TRADEMARK OFFICE
CERTIFICATE OF CORRECTION

PATENT NO. : 7,205,072 B2  Page 1 of 1
APPLICATION NO. : 10/699484
DATED : April 17, 2007
INVENTOR(S) : Sun-Ho Kang and Khalil Amine It is certified that error appears in the above-identified patent and that said Letters Patent is hereby corrected as shown below:

IN THE CLAIMS:

Column 5, Line 59: Delete "than and" and replace it with --than 0 and--.

Column 6, Line 8: Delete "$Li_{1-x}$" and replace it with --$Li_{1+x}$--.

Column 6, Line 67: Delete "power" and replace it with --powder--.

Column 7, Line 10: Delete "(or" and replace it with --or--.

Signed and Sealed this

Twenty-sixth Day of June, 2007

JON W. DUDAS
*Director of the United States Patent and Trademark Office*

UNITED STATES PATENT AND TRADEMARK OFFICE
CERTIFICATE OF CORRECTION

PATENT NO. : 7,205,072 B2  Page 1 of 1
APPLICATION NO. : 10/699484
DATED : April 17, 2007
INVENTOR(S) : Sun-Ho Kang and Khalil Amine It is certified that error appears in the above-identified patent and that said Letters Patent is hereby corrected as shown below:

IN THE CLAIMS:

Column 6, line 66 please delete "4500C" and replace it with --450°C--.

Column 7, line 26 please delete "α" and replace it with --a--.

Signed and Sealed this

Twenty-second Day of July, 2008

JON W. DUDAS
*Director of the United States Patent and Trademark Office*

UNITED STATES PATENT AND TRADEMARK OFFICE
CERTIFICATE OF CORRECTION

| | |
|---|---|
| PATENT NO. | : 7,205,072 B2 |
| APPLICATION NO. | : 10/699484 |
| DATED | : April 17, 2007 |
| INVENTOR(S) | : Kang et al. |

It is certified that error appears in the above-identified patent and that said Letters Patent is hereby corrected as shown below:

Column 6, line 66 please delete "4500C" and replace it with --450°C--.

Column 7, line 26 please delete "α" and replace it with --a--.

Signed and Sealed this

Twelfth Day of August, 2008

JON W. DUDAS
*Director of the United States Patent and Trademark Office*